United States Patent
Sekihata

(10) Patent No.: US 7,518,988 B2
(45) Date of Patent: Apr. 14, 2009

(54) RING SWITCHOVER METHOD

(75) Inventor: Osamu Sekihata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 754 days.

(21) Appl. No.: 10/692,066

(22) Filed: Oct. 23, 2003

(65) Prior Publication Data

US 2004/0081083 A1  Apr. 29, 2004

(30) Foreign Application Priority Data

Oct. 25, 2002  (JP)  ............................ 2002-310963

(51) Int. Cl.
*H04L 12/26* (2006.01)
(52) U.S. Cl. ....................... 370/222; 370/244
(58) Field of Classification Search ................ 370/242, 370/248, 252, 392, 235, 216–222, 224–225, 370/236, 244, 250, 393; 709/239, 424
See application file for complete search history.

(56) References Cited

U.S. PATENT DOCUMENTS

| | | | |
|---|---|---|---|
| 5,487,062 A | | 1/1996 | Yanagi et al. |
| 6,574,197 B1 * | | 6/2003 | Kanamaru et al. .......... 370/252 |
| 6,680,912 B1 * | | 1/2004 | Kalman et al. .............. 370/238 |
| 7,076,594 B2 * | | 7/2006 | Benedetto et al. ........... 710/316 |
| 7,085,224 B1 * | | 8/2006 | Oran .......................... 370/216 |
| 7,394,758 B2 * | | 7/2008 | Gonda ........................ 370/218 |
| 2003/0165117 A1 * | | 9/2003 | Garcia-Luna-Aceves et al. ........................ 370/238 |
| 2005/0249123 A1 * | | 11/2005 | Finn ............................ 370/242 |
| 2008/0259784 A1 * | | 10/2008 | Allan et al. ................. 370/216 |

FOREIGN PATENT DOCUMENTS

| | | |
|---|---|---|
| JP | 6-303248 | 10/1994 |
| JP | 9-224026 | 8/1997 |
| JP | 2001-308893 | 11/2001 |

OTHER PUBLICATIONS

IEEE 802.17 Working Group, "Proposed Draft Standard: Part 17: Resilient Packet Ring Access Method and Physical Layer Specifications", Jan. 29, 2002.*
ANSI/IEEE Std. 802 1D, Media Access Control (MAC) Bridges, 1998.
Japanese Office Action mailed Jul. 3, 2007, from the corresponding Japanese Application 2002-310963.

* cited by examiner

*Primary Examiner*—Aung S Moe
*Assistant Examiner*—Feben M Haile
(74) *Attorney, Agent, or Firm*—Katten Muchin Rosenman LLP

(57) ABSTRACT

A fast ring switchover is enabled in packet level processing at the time of ring configuration, and as a result, a system switchover function can be implemented in an Ethernet switch or the like by a ring switchover method in a network constituted of layer 2 switches connected in a ring shape, each layer 2 switch having a path control function and a failure detection function. The ring switchover method includes the steps of providing in each layer 2 switch an address learning table in which a Media Access Control (MAC) address and a corresponding port are stored; on detection of a link failure between mutually neighboring layer 2 switches, transmitting a failure notification frame packet from each neighboring layer 2 switch; and in the layer 2 switch having received the failure notification frame, recording a Media Access Control (MAC) address of said layer 2 switch into the failure notification frame, and transferring the failure notification frame to a neighboring layer 2 switch.

6 Claims, 6 Drawing Sheets

| | OCTET |
|---|---|
| PROTOCOL IDENTIFIER | 1 |
| | 2 |
| PROTOCOL VERSION NO. | 3 |
| TYPE VALUE | 4 |
| FLAG | 5 |
| ROOT PRIORITY | 6 |
| ROOT ID | 7 |
| | 8 |
| | 9 |
| | 10 |
| | 11 |
| | 12 |
| ROOT PASS COST | 13 |
| | 14 |
| | 15 |
| | 16 |
| BRIDGE ID | 17 |
| | 18 |
| | 19 |
| | 20 |
| | 21 |
| | 22 |
| PORT ID | 23 |
| | 24 |

FIG. 6

| Field | OCTET |
|---|---|
| PROTOCOL IDENTIFIER | 1 |
|  | 2 |
| PROTOCOL VERSION NO. | 3 |
| TYPE VALUE | 4 |
| FLAG | 5 |
| NUMBER OF ENTRIES | 6 |
|  | 7 |
| BRIDGE ID#1 | 8 |
|  | 9 |
|  | 10 |
|  | 11 |
|  | 12 |
|  | 13 |
| BRIDGE ID#2 | 14 |
|  | 15 |
|  | 16 |
|  | 17 |
|  | 18 |
|  | 19 |

⋮

| Field | OCTET |
|---|---|
| BRIDGE ID#n |  |

FIG. 7

| Field | OCTET |
|---|---|
| PROTOCOL IDENTIFIER | 1 |
|  | 2 |
| PROTOCOL VERSION NO. | 3 |
| TYPE VALUE | 4 |
| FLAG | 5 |
| BRIDGE ID | 6 |
|  | 7 |
|  | 8 |
|  | 9 |
|  | 10 |
|  | 11 |
| PORT ID | 12 |
|  | 13 |

FIG. 8

| Field | OCTET |
|---|---|
| PROTOCOL IDENTIFIER | 1 |
| | 2 |
| PROTOCOL VERSION NO. | 3 |
| TYPE VALUE | 4 |
| FLAG | 5 |
| BRIDGE ID | 6 |
| | 7 |
| | 8 |
| | 9 |
| | 10 |
| | 11 |
| NUMBER OF ENTRIES | 12 |
| | 13 |
| ENTRY#1 | 14 |
| | 15 |
| | 16 |
| | 17 |
| | 18 |
| | 19 |
| ENTRY#2 | 20 |
| | 21 |
| | 22 |
| | 23 |
| | 24 |
| | 25 |

⋮

| ENTRY#n | |

RING SWITCHOVER METHOD

FIELD OF THE INVENTION

The present invention relates to a ring switchover method particularly having features in view of system configuration, failure detection and path switchover in a network constituted of layer 2 switches connected in a ring shape with a path control function and a failure detection function.

BACKGROUND OF THE INVENTION

In recent years, there have been increased needs toward constructing intranet corporate networks incorporating access to the Internet and the Internet Protocol (IP). Communication services provided by communication operating companies featuring provision of an end user interface through IP packets has started, in which a variety of methods are employed.

One form of such network configurations is a ring-structured layer 2 Ethernet network (the Ethernet is standardized in the IEEE 802.3.)

In FIG. 1, one exemplary configuration of such a layer 2 Ethernet network is shown. The network accommodated in a backbone network 100 is constituted of layer 2 (L2) switches (or bridges) #1-#8 connected in a ring shape.

Further, the Spanning Tree Protocol (STP) is known as a network configuration protocol. The STP is a protocol for logically making a tree-structured network, so as not to produce a loop structure in a layer 2 network (where layer 2 denotes the second layer in the Open System Interconnection, OSI. As for the STP, for example, refer to ANSI/IEEE Standard 802.1d.

Among switches (bridges) constituting a system, a representative bridge (which is referred to as root bridge) is selected, and a tree-structured network is logically configured from the root bridge. Also in the ring network shown in FIG. 1, it is possible to configure a tree-structured network logically.

The STP enables to configure logical links in FIG. 1, which include a first link directing in the clockwise direction from L2 switch #1 to L2 switch #5, and a second link directing in the counterclockwise direction from L2 switch #1 to L2 switch #6.

To enable such a tree structure by use of the STP, each switch (bridge) transmits a control frame (configuration frame) in an initialization process which is performed in the event of the power switched on. In a bridge receiving the control frame (configuration frame), when an operation system has already been established, the current root bridge (L2 switch #2) is remained as the root bridge, and the added bridge is newly incorporated in the system. Thus system reconfiguration is carried out.

A link weight between bridges is defined as a path cost. After the path cost is added to the value set in the control frame (configuration frame) which is transmitted from the root bridge, the frame is forwarded to a neighboring bridge.

In each switch (bridge), when control frames (configuration frames) are received (that is, two control frames are received totally) from the two ports connected to the ring, the switch (bridge) of interest compares the path costs which are set in the two control frames (configuration frames). As a result of this comparison, the port side which has received the control frame (configuration frame) having a greater path cost is treated as a blocking port, in which entire frames for transmission are blocked.

In the example shown in FIG. 1, the port provided in L2 switch #5 and is directing to L2 switch #6 is regarded as the blocking port. In such a way, a logical tree structure is formed.

Here, in a network set by the STP as described above, when a failure occurs on any link, for example, on a link located between L2 switch #7 and L2 switch #8, data transmission on a link directed from L2 switch #7 toward L2 switch #6 becomes unable. In such a case, it is necessary to remove the block condition having been set in the blocking port of L2 switch #5, as well as to perform a ring switchover so that a link directed from L2 switch #5 toward L2 switches #6 and #7 is established.

In a conventional ring-structured network, the STP (Spanning Tree Protocol) specified in the IEEE 802.1d is usually employed as a method for ring switchover in the event of a failure.

FIG. 2 shows a diagram illustrating STP state transitions in each port of a switch.

In FIG. 2, when the STP is enabled, there exist four states, A, B, C and D. The contents of each state are illustrated below.

(A) Blocking: A state in which a certain port does not take part in forwarding a control frame (configuration frame). In this state, a received control frame (configuration frame) is discarded without forwarding.

(B) Listening: A state in which a control frame (configuration frame) is ready for forwarding. Forwarding the control frame (configuration frame) is temporarily set disabled to prevent from forming a temporary loop.

(C) Learning: A state in which a control frame (configuration frame) is ready for forwarding. In this state, only receiving function is enabled, and a source Media Access Control (MAC) address is learned and registered into a table.

(D) Forwarding: A state in which a control frame (configuration frame) can be forwarded. In this state, a received control frame (configuration frame) is forwarded to a neighboring port.

Among the above-mentioned four states, the state is either (A) Blocking or (D) Forwarding during a stationary state.

Further, in FIG. 2, reference numbers (1)-(5) denote transition conditions, the contents of which are as illustrated below.

(1) A port state is changed from an STP disabled state to an STP enabled state, initiated either by an administrator or in the initial setting.

(2) A port is changed from the STP enabled state to the STP disabled state.

(3) Selection of a root port.

(4) Selection of an alternative port.

(5) Completion of a protocol timer (forwarding time)

Here, in FIG. 2, a port is in (A) Blocking state in the event of a failure. In order to reestablish a link by shifting to (D) Forwarding state, it is necessary to shift from (A) Blocking→(B) Listening→(C) Leaning→(D) Forwarding in the transition diagram shown in FIG. 2.

In order to shift from (A) Blocking→(B) Listening, in other words to perform (3) selection of a root port, a default time of 20 seconds is being set. Further, in order to shift from (B) Listening→(C) Learning, and from (C) Learning→(D) Forwarding, in other words as a transfer time, a default time of 15 seconds is being set, respectively.

Thus, according to the default setting, it is required 50 seconds for a link switchover by use of the STP to shift from (A) Blocking state to (D) Forwarding state in the event of a failure.

As described above, the STP is a protocol for avoiding occurrence of loop path in an L2 network, by which a time of 50 seconds is normally required for a system reconfiguration. This impedes to maintain a session of an application.

SUMMARY OF THE INVENTION

Accordingly, it is an object of the present invention to provide in a ring-structured layer 2 network a method for shortening a switchover time in the event of a failure.

As a first aspect of a ring switchover method in accordance with the present invention to solve the aforementioned problem, there is provided a network constituted of layer 2 switches connected in a ring shape, wherein each layer 2 switch has a path control function and a failure detection function. Each layer 2 switch is provided with an address learning table which stores both a MAC address and a corresponding port. The ring switchover method of the present invention includes the following steps: On detection of a link failure between mutually neighboring layer 2 switches, the layer 2 switch transmits a failure notification frame packet from the above-mentioned each neighboring layer 2 switch. On reception of the failure notification frame, the layer 2 switch records its own MAC address into the failure notification frame and forwards the failure notification frame to a neighboring layer 2 switch.

As a second aspect of the ring switchover method in accordance with the present invention, in the first aspect of the ring switchover method, when the layer 2 switch having a blocking port receives the failure notification frame, the layer 2 switch stores into the failure notification frame a record indicative of having the blocking port.

As a third aspect of the ring switchover method in accordance with the invention, there is provided a ring switchover method in a network constituted of layer 2 switches connected in a ring shape, in which each layer 2 switch has a path control function and a failure detection function. Each layer 2 switch is provided with an address learning table storing both a MAC address and a corresponding port. The layer 2 switch connected in a ring shape transmits a state notification frame successively to a neighboring layer 2 switch. In the neighboring layer 2 switch, when the state notification frames are not received for a predetermined number of times, it is detected that the corresponding neighboring layer 2 switch is faulty. A failure notification frame packet is transmitted from the layer 2 switch having detected the failure. On receipt of the failure notification frame, the layer 2 switch records its own MAC address into the failure notification frame and transmits the failure notification frame to a neighboring layer 2 switch.

As a fourth aspect of the ring switchover method in accordance with the invention, in any one of the first aspect to the third aspect, the network formed of a ring shape is constituted of a system having a configuration separated at one point of the ring-shaped network. When the network is separated into two groups caused by a failure, in respect of a host address connected to an arbitrary layer 2 switch, path information is updated in the address learning table of a layer 2 switch belonging to the other group than the group which includes the above-mentioned layer 2 switch, so that a packet transmission direction on the ring is shifted to a port side located opposite to the direction having been used up to the present.

Further, as a fifth aspect of the ring switchover method in accordance with the invention, in the fourth aspect, the path information is updated in the address learning table by exchanging address information related to system modification by use of a system switchover frame between the above-mentioned arbitrary layer 2 switch and a layer 2 switch belonging to the other group.

Still further, as a sixth aspect of the ring switchover method in accordance with the invention, in the fourth aspect, updating the path information in the address learning table is performed by transmitting either a broadcast frame in which a MAC address of a host under each layer 2 switch is set as an originating address, or a frame dedicatedly provided for updating the address learning table, at the time of a system switchover.

Further scopes and features of the present invention will become more apparent by the following description of the embodiments with the accompanied drawings.

BRIEF DESCRIPTION OF THE DRAWINGS

FIG. 6 shows a diagram illustrating a failure notification frame.

FIG. 7 shows a diagram illustrating a state notification frame.

FIG. 8 shows a diagram illustrating a system switchover information frame.

DETAILED DESCRIPTION OF THE PREFERRED EMBODIMENTS

The preferred embodiment of the present invention is described hereinafter referring to the charts and drawings.

Figure 3:
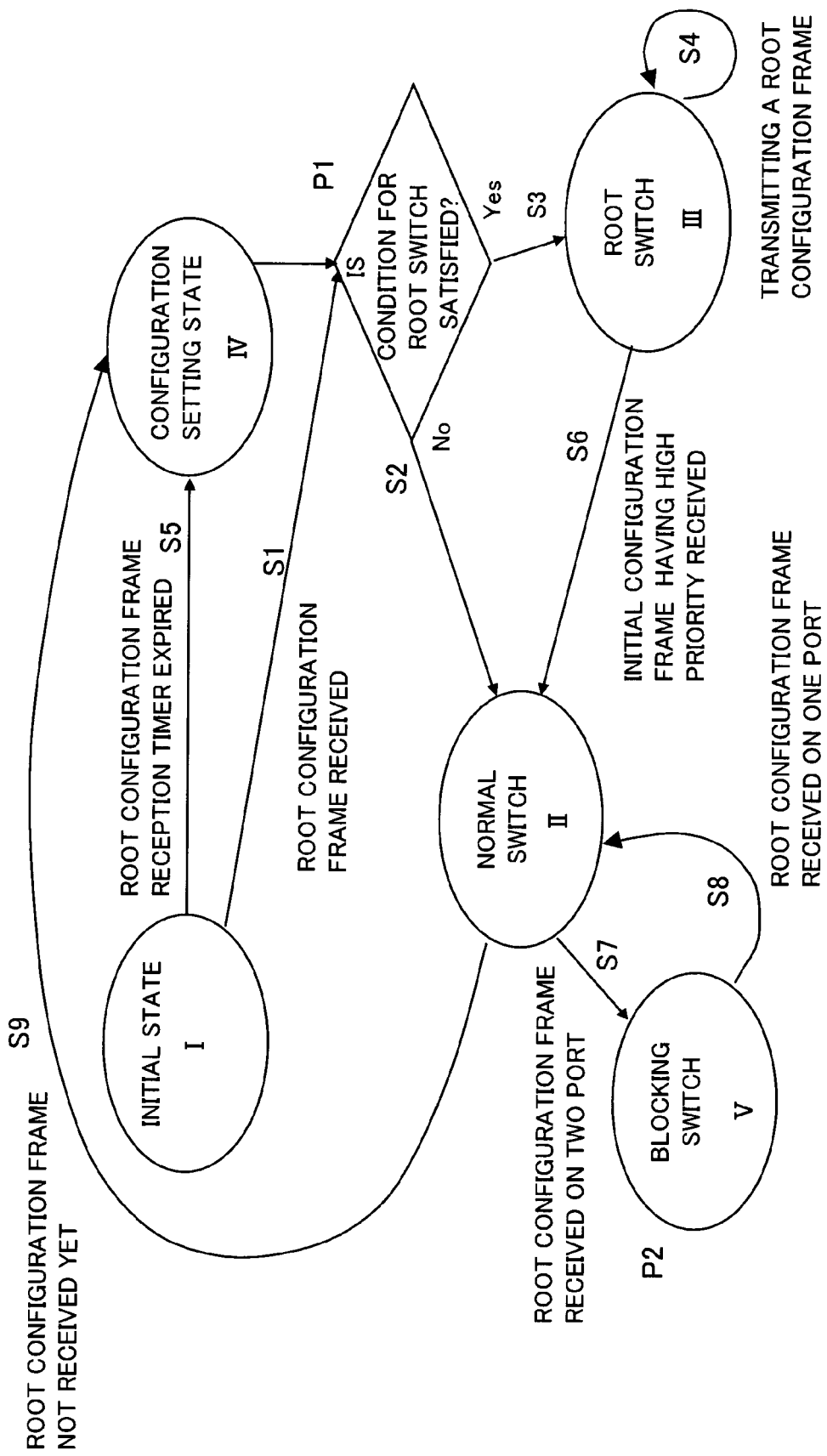
FIG. 3 shows a state transition diagram of an L2 switch illustrating a system configuration method as a premise of the ring switchover method in accordance with the present invention.

FIG. 3 shows a state transition diagram of an L2 (layer 2) switch illustrating a system configuration method, which is a premise to a ring switchover method of the present invention.

Figures 4, 5:
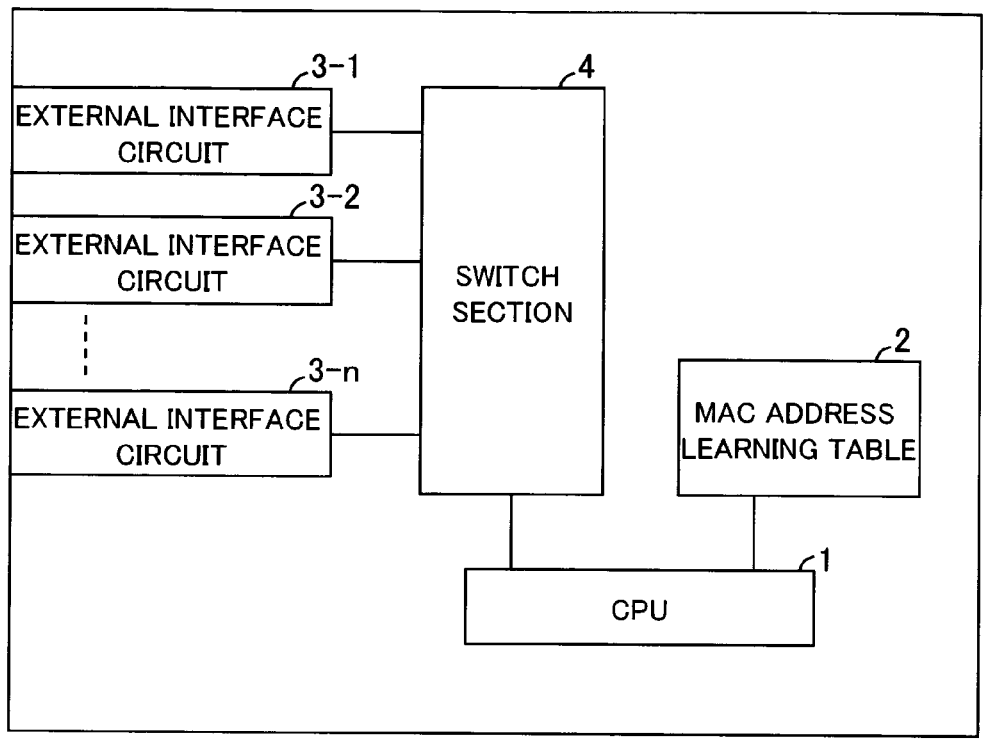
FIG. 4 shows a block diagram of the L2 switch configuration.
FIG. 5 shows a diagram illustrating a packet format of a root/initial configuration notification frame.

FIG. 4 shows a block diagram illustrating an L2 switch configuration. The L2 switch is constituted of a CPU 1 functioning as a control means, a MAC address learning table 2 of which read/write control is performed by CPU 1, and a switch section 4 which connects and releases among a plurality of external interface circuits 3-1 to 3-n connected to the respective ports of the switch.

In MAC address table 2, MAC addresses each corresponding to each port number are set and registered. By this setting, a connection port to which a packet is forwarded (connection to neighboring L2 switches or connection to a host (terminal) under the switch) is specified, thus enabling a system configuration.

In FIG. 3, when power is switched on, a control frame (configuration frame) is transmitted in a consecutive initialization process.

Here, as the control frame (configuration frame), there is employed a root configuration frame having a flag '01' in the fifth octet of the packet format shown in FIG. 5. The information included in this root configuration frame is as follows.

Namely, as shown in FIG. 5, the information includes: ① protocol identification code and version number (1st-3rd octets in FIG. 5), ② root priority (6th octet in FIG. 5), ③ root ID (identification code) (7th-12th octets in FIG. 5), ④ root pass cost (13th-16th octets in FIG. 5), ⑤ bridge ID (17th-22nd octets in FIG. 5), and ⑥ port ID (23rd-24th octets in FIG. 5).

In the initialization process, when the system configuration has already been established, the switch which is currently assigned as a root bridge (i.e. L2 switch #1 in the example shown in FIG. 1) remains unchanged as the root bridge, and the system is reconfigured by newly incorporating the added switch.

A weight of an each link between switches (bridges) is defined as a path cost. After the path cost is added to the value in the control frame (configuration frame) transmitted from the root switch, the control frame (configuration frame) is forwarded to a neighboring switch.

In the switch (for example, L2 switch #5 shown in FIG. 5), having received two control frames (configuration frames) respectively from the two ports connected to the ring, the path costs included in the two control frames (configuration frames) are compared with each other. As a result, a port having a greater path cost is determined as a blocking port, from which frame transmission is entirely blocked.

Figure 1:
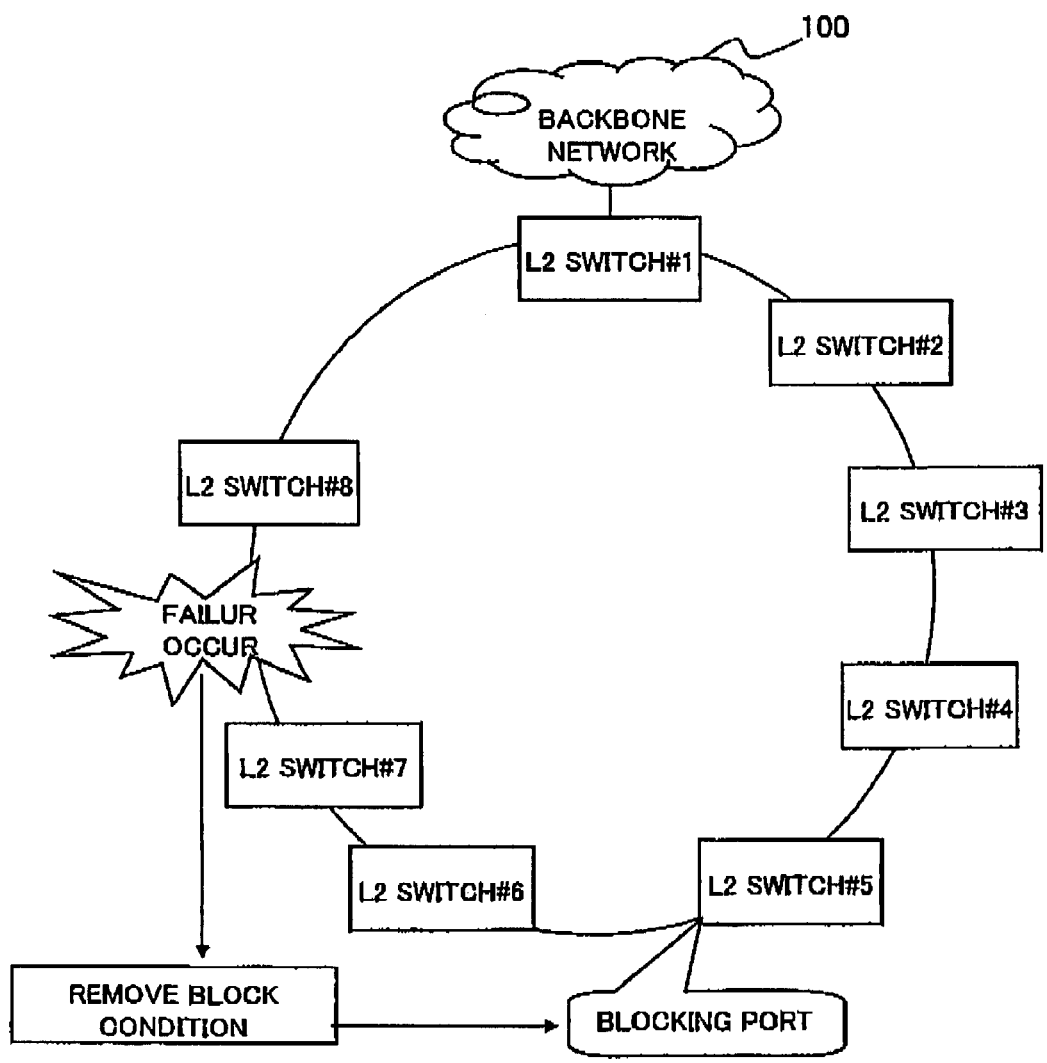
FIG. 1 shows a diagram illustrating one exemplary configuration of a layer 2 Ethernet network.
Figure 2:
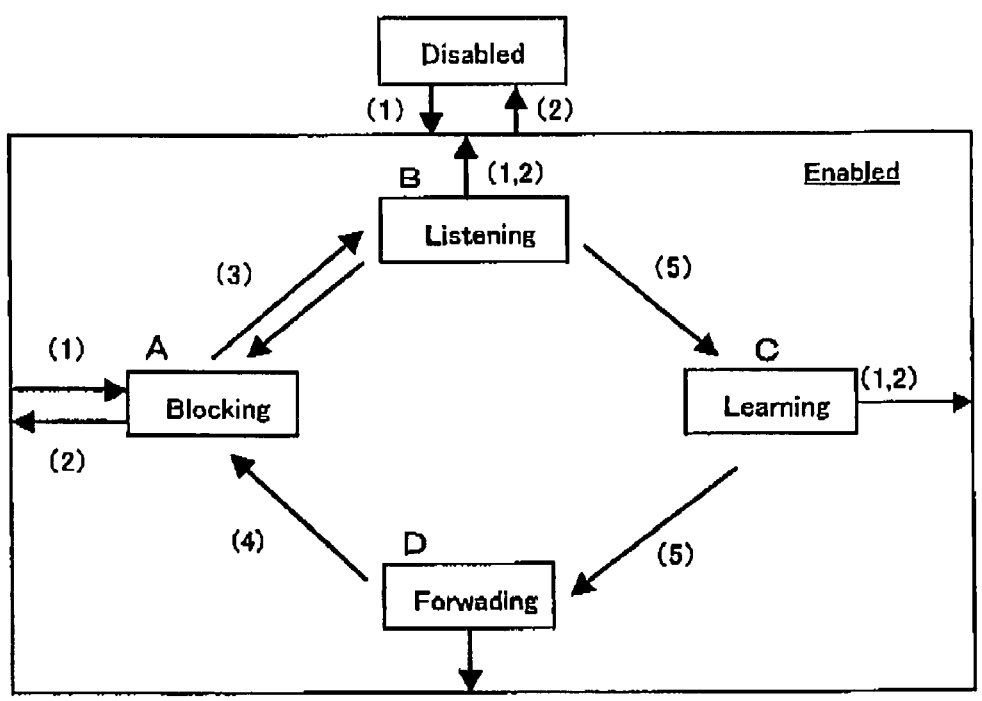
FIG. 2 shows a diagram illustrating STP state transitions in each port of a switch.

In L2 switch #5 shown in the example of FIG. 1, the port in L2 switch #5 directing to L2 switch #6 is determined as the blocking port.

When a root bridge is nonexistent, control frames (configuration frames) are interchanged and, as a result, a root bridge is newly selected. Here, a root bridge is determined by selecting a switch having the greatest root priority value. When the root priority values is equal among the switches, a switch having the lowest MAC address (bridge ID) is selected as a root bridge.

Referring to FIG. 3, processing in each node according to one embodiment of the present invention will be described below in more detail. In FIG. 3, on completion of the initial setup after the power switched on, the L2 switch concerned is set into an initial state I.

In this condition, on receiving a root configuration frame having a flag '01' in the 5th octet of a root/initial configuration frame shown in FIG. 5 (step S1), the root switch information (6th-24th octets) in the frame is compared with the configuration information having been set in switch section 4 of the L2 switch concerned (procedure P1).

As a result of the comparison between the setting in the L2 switch of interest and the information on the root switch in the system, when the root switch information in the system is stronger (that is, the root priority of the current root switch indicated in the 6th octet is higher) than that of the L2 switch of interest, this L2 switch does not satisfy conditions for functioning as a root switch ('No' in procedure P1). Accordingly the L2 switch is shifted into an Normal switch state II (step S2).

Meanwhile, as a result of the comparison performed in the procedure P1, when the L2 switch of interest has a higher priority for functioning as a root switch ('Yes' in procedure P1), the L2 switch concerned is shifted into a root switch state III (step S3). Once the L2 switch is determined as the root switch, the L2 switch begins to transmit root configuration frames at predetermined intervals (step S4).

Now, while the L2 switch is in the initial state I, if the L2 switch has not received a root configuration frame when the predetermined time set in the timer expires, the L2 switch is shifted to a configuration setting state IV (step S5). While the L2 switch stays in the configuration setting state IV, when an initial configuration frame (in which a flag '00' is set in the frame shown in FIG. 5) is received from a neighboring switch, the L2 switch compares the parameters of the root priority and the bridge ID with the parameters set in the L2 switch of interest (procedure P1).

When the received initial configuration frame has either a higher root priority than the own priority of the L2 switch, or an equal root priority and a lower bridge ID value, the L2 switch of interest is shifted to the ordinary switch state II (step S2).

At this time, the received initial configuration frame is duplicated to another port side of the link, and is forwarded to a neighboring L2 switch.

When the predetermined time set in the timer of the L2 switch expires and the L2 switch is shifted to the configuration setting state IV, and the L2 switch is not shifted to the ordinary switch state II by the processing in the procedure P1, the L2 switch is shifted to the root switch state III (step S3).

In the root switch state III, the L2 switch functioning as the root switch begins to transmit root configuration frames at predetermined intervals (step S4).

On receipt of the initial configuration frame, the root switch compares parameters of the root priority and the bridge ID with the own parameter values set in switch section 4 of the root switch. Here, switch section 4 is actually constituted of software settings which are processed by the CPU.

As a result of this comparison, if the received initial configuration frame has either a higher priority than the own priority of the root switch, or an equal priority and a lower bridge ID value than the root switch has, the root switch is shifted to the Normal switch state II (step S6). Otherwise, when the root switch has a higher root priority, the root switch (i.e. the L2 switch of interest) continues to function as root switch.

While the L2 switch of interest stays in the Normal switch state II, on receiving the root configuration frame, the L2 switch adds a path cost (weight) of the received port to the root path cost in the root configuration frame (13th to 16th octets shown in FIG. 5). After reconfiguring the root configuration frame, the L2 switch of interest transmits the root configuration frame to another port connected to the ring.

When the L2 switch receives the root configuration frames on the two ports constituting the ring while the L2 switch stays in the Normal switch state II (step S7), the L2 switch compares the respective root path costs. The port having a larger root path cost value is determined to be as blocking port, which results in making the transmission side of the port concerned blocked. Thus the switch is shifted to a blocking switch state V (procedure P2). Here, in the blocking switch state V, only reception is permitted (step S8).

Further, while in the Normal switch state II, when the root configuration frame has not been received for the predetermined time, the L2 switch is shifted to the configuration setting state IV (step S9). Consecutive state transitions are identical to those described above.

Now, description on failure detection follows hereafter. In the event of a link break, the L2 switches connected to both sides of the link detect the link break. The link break is detected by sensing either an impedance variation or a level variation of the link. The L2 switch having detected the link break notifies a neighboring L2 switch of this link break by use of a failure notification frame shown in FIG. 6 as the control frame.

Also, in order to detect an equipment failure, not a link break, the conditions of neighboring L2 switches are mutually supervised constantly. More specifically, state notification frames shown in FIG. 7 are transmitted to the neighboring switches as the control frames.

When a state notification frame cannot be detected for three (3) consecutive times, each L2 switch recognizes a failure having occurred in the neighboring switch. Necessary information sets for this detection to be provided in the failure notification frame and the state notification frame are: ① frame identification code (ID) and version information, ② bridge identification code (ID), and ③ port identification code (ID).

An embodiment of the aforementioned failure detection method will be described in the following. A failure is detected in both L2 switch sides of the failure point. Next, failure notification frame packets shown in FIG. 6 are transmitted from the respective L2 switches.

In the failure notification frame shown in FIG. 6, '02' is set as a type value, which indicates the notification frame. Also, the number of bridge IDs is recorded in the number of entries. In the bridge IDs #1-#n, respective MAC addresses of the switches having ID #i are indicated.

On receipt of this failure notification frame, the neighboring L2 switch adds the own bridge ID of the L2 switch to this frame and forwards promptly to the neighboring L2 switch. Thus, bridge IDs are successively accumulated in the failure notification frame, as shown in FIG. 6. By this, the entire switches on the ring are able to recognize the failure.

At this time, the blocking switch (L2 switch #5 in the example shown in FIG. 1) stores an entry of consecutive 'F' (FFFFFFFFFFFF), following the bridge ID of the own MAC address.

Next, failure detection in the case of equipment failure with maintained link conditions is taken into consideration. In this case, state notification frame packets shown in FIG. 7 are transmitted successively to the neighboring switches at predetermined timer intervals.

In the state notification frame shown in FIG. 7, '02' is set as a type value, which indicates a notification frame. By referring to MAC address learning table 3, the own MAC address is set as a bridge ID, and a frame transmission port number is set as a port ID.

Therefore, in the ports except for the L2 switch port located opposite to the blocking port in L2 switch #5, the above-mentioned state notification frame is to be received constantly.

Therefore, when state notification frames cannot be received for three (3) consecutive times within a predetermined period set in a timer, the switch concerned determines a failure has occurred. On recognizing the failure, failure notification frame packets are transmitted successively to neighboring L2 switches, as described earlier.

Now, a method for a system switchover following the transmission of the failure notification frame packet will be described below.

When performing the system switchover, if the L2 switches constituting the ring shown in FIG. 1 are separated into two groups, i.e. a group A including L2 switches #1 -#5, #8 and #9, and a group B including L2 switches #6 and #7, it is not necessary to modify path information among switches belonging to each identical group, group A or group B. However, it is necessary to modify path information between an L2 switch belonging to group A and another L2 switch belonging to group B.

For this purpose, with regard to an address of a host (i.e. a terminal such as a personal computer and a server) which belongs to an arbitrary L2 switch, it becomes necessary to modify the path information in MAC address learning table 2 of any L2 switches which belong to the other group than the group the L2 switch of interest belongs to. In this modification, a packet transmission direction on the ring is to be shifted to a port side opposite to the direction having been used up to now.

As a typical method for this operation, there are methods in accordance with the present invention as illustrated in the following.

One method is to exchange system modification information (address information) by use of a control frame, which is referred to as a system switchover information frame as shown in FIG. 8. The other method is to transmit a dedicated frame at the time of the switchover against each entry information unit on a host-by-host basis located under each L2 switch.

Necessary information sets in the control frame (system switchover information frame) are; ① frame identification code (type value) and version information, ② bridge identification code (ID), ③ host information (entry number), as shown in FIG. 8.

One embodiment of this system switchover method will be illustrated in the following.

A failure detected by the failure detection method described earlier is notified by use of a failure notification frame packet transmitted from the L2 switch which has detected the failure. Therefore, by receiving this failure notification frame, the entire switches can recognize the failure occurrence in the ring. Namely, because the bridge ID number concerned is registered successively in each L2 switch receiving the failure notification frame, it is possible for any L2 switch to identify the failure location.

Moreover, by use of the failure notification frame, it is possible to identify the location relation between the failure point and the blocking switch. Here, the required path information modification of each switch at the time of the failure occurrence depends on the relation of the locations between the failure point and the blocking switch. Each L2 switch can determine which path information of a host (terminal) belonging to which switch is to be modified.

As a method for notifying path information within the system, the system switchover information frame shown in FIG. 8 is used. According to this method, a host address belonging to an arbitrary switch is stored in the system switchover information frame ('03' is set as a type value), which is notified to the L2 switches in the system. There may be a case that the maximum frame length in the Ethernet is too short to cover the whole number of entries. To cope with this case, a plurality of packets are used to transmit the whole information separately in packets.

According to the other method, it is possible for each L2 switch to transmit either a broadcast frame, in which the MAC address of a host under the L2 switch of interest is used as an originating address, or a frame dedicatedly provided for use in updating address learning table 2 (refer to FIG. 4). Also, there may be applicable a simple method of erasing address learning table 2 by each L2 switch having detected a failure.

As the present invention has been described in accordance with the accompanied drawings, the method of the present invention enables a fast ring switchover performed in packet level processing at the time of ring configuration. As a result, it becomes possible to implement a system switchover function in an Ethernet switch or the like, which was dealt with by the prior art only in expensive devices such as SDH/SONET devices.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. A ring switchover method in a network constituted of layer 2 switches connected in a ring shape, each layer 2 switch having a path control function and a failure detection function, said ring switchover method comprising:

providing in each layer 2 switch an address learning table in which a Media Access Control (MAC) address and a corresponding port are stored;

on detection of a link failure between mutually neighboring layer 2 switches, transmitting a failure notification from packet from each neighboring layer 2 switch;

in a layer 2 switch having received the failure notification frame, recording a Media Access Control (MAC) address of said layer 2 switch into the failure notification frame, and transferring the failure notification frame to a neighboring layer 2 switch;

wherein, when the network is separated into two network groups caused by a failure, with respect to a host address connected to an arbitrary layer 2 switch, updating path information in the address learning table in a layer 2 switch belonging to the other group than the group to which said layer 2 switch belongs, so that a packet transmission direction on the ring is shifted to a port side opposite to the direction having been used up to the present; and, wherein updating the path information in the address learning table is performed by exchanging address information related to system modification between the arbitrary layer 2 switch and the layer 2 switch belonging to the other group by use of a system switchover frame.

2. The ring switchover method according to claim 1, wherein updating the path information in the address learning table is performed by transmitting either a broadcast frame in which a Media Access Control (MAC) address of a host under each layer 2 switch is set as an originating address, or a frame dedicatedly provided for updating the address learning table, at the time of a system switchover.

3. A ring switchover in a network constituted of layer 2 switches connected in a ring shape, each layer 2 switch having a path control function and a failure detection function, said ring switchover method comprising:

providing in each layer 2 switch an address learning table in which a Media Access Control (MAC) address and a corresponding port are stored;

on detection of a link failure between mutually neighboring layer 2 switches, transmitting a failure notification from packet from each neighboring layer 2 switch;

in a layer 2 switch having received the failure notification frame, recording a Media Access Control (MAC) address of said layer 2 switch into the failure notification frame, and transferring the failure notification frame to a neighboring layer 2 switch, wherein, on receipt of the failure notification frame in a layer 2 switch having a blocking port, said layer 2 switch stores a record, indicative of the layer 2 switch of interest having a blocking port, into the failure notification frame;

wherein, when the network is separated into two network groups caused by a failure, with respect to a host address connected to an arbitrary layer 2 switch, updating path information in the address learning table in a layer 2 switch belonging to the other group than the group to which said layer 2 switch belongs, so that a packet transmission direction on the ring is shifted to a port side opposite to the direction having been used up to the present; and, wherein updating the path information in the address learning table is performed by exchanging address information related to system modification between the arbitrary layer 2 switch and the layer 2 switch belonging to the other group by use of a system switchover frame.

4. The ring switchover method according to claim 3, wherein updating the path information in the address learning table is performed by transmitting either a broadcast frame in which a Media Access Control (MAC) address of a host under each layer 2 switch is set as an originating address, or a frame dedicatedly provided for updating the address learning table, at the time of a system switchover.

5. A ring switchover method in a network constituted of layer 2 switches connected in a ring shape, each layer 2 switch having a path control function and a failure detection function, said ring switchover method comprising:

providing in each layer 2 switch an address learning table in which a Media Access Control (MAC) address and a corresponding port are stored;

transmitting a state notification frame from a layer 2 switch connected in the ring shape successively to neighboring layer 2 switches;

in the neighboring layer 2 switch, detecting that the corresponding neighboring layer 2 switch is faulty when the state notification frames are not received for a predetermined number of times;

transmitting a failure notification frame packet from the layer 2 switch having detected the failure;

recording a Media Access Control (MAC) address of a layer 2 switch having received the failure notification frame into said failure notification frame;

transferring the failure notification frame to a neighboring layer 2 switch;

wherein, when the network is separated into two network groups caused by a failure, with respect to a host address connected to an arbitrary layer 2 switch, updating path information in the address learning table in a layer 2 switch belonging to the other group than the group to which said layer 2 switch belongs, so that a packet transmission direction on the ring is shifted to a port side opposite to the direction having been used up to the present; and, wherein updating the path information in the address learning table is performed by exchanging address information related to system modification between the arbitrary layer 2 switch and the layer 2 switch belonging to the other group by use of a system switchover frame.

6. The ring switchover method according to claim 5, wherein updating the path information in the address learning table is performed by transmitting either a broadcast frame in which a Media Access Control (MAC) address of a host under each layer 2 switch is set as an originating address, or a frame dedicatedly provided for updating the address learning table, at the time of a system switchover.

* * * * *